Jan. 24, 1967 D. N. ARDEN 3,300,627

APPARATUS FOR REAL-TIME MULTIPLICATION

Filed Nov. 30, 1962 2 Sheets-Sheet 1

INVENTOR.
DEAN N. ARDEN
BY Rines and Rines
ATTORNEYS

APPARATUS FOR REAL-TIME MULTIPLICATION

Filed Nov. 30, 1962 2 Sheets-Sheet 2

INVENTOR.
DEAN N. ARDEN

BY Rines and Rines

ATTORNEYS

United States Patent Office 3,300,627

Patented Jan. 24, 1967

3,300,627

APPARATUS FOR REAL-TIME MULTIPLICATION

Dean N. Arden, Lexington, Mass., assignor of one-third to Robert H. Rines, Belmont, Mass.

Filed Nov. 30, 1962, Ser. No. 241,359
30 Claims. (Cl. 235—160)

The present invention relates to methods of and apparatus for real-time multiplication.

It has not heretofore been considered feasible to produce real-time multiplication in electrical and electronic computer circuits and the like; that is, multiplication in which the multiplicand and multiplier signal information enter the circuit with the least significant digit first, and the circuit produces product digits in the output thereof at the same rate that the multiplicand and multiplier signals are being fed in. To the contrary, prior-art computer circuits have required a complete serial addition of the multiplicand for each digit of the multiplier, necessitating, in general, a shift register for the multiplier, a shift register for the multiplicand, a shift register for the product, a full adder device and appropriate counters for controlling the length of the cycle required to add the multiplicand to the partial product once for every digit of the multiplier. Only one digit of the product can be produced for each addition of the multiplicand, and the addition of the multiplicand requires shifting the complete shift register thereof. Thus, the product is produced at a very slow rate compared with the availability of the digits of the multiplicand.

An object of the present invention, accordingly, is to provide a new and improved method of and apparatus for multiplication in which the product is produced at the same rate as the introduction of the digits of the multiplicand and the multiplier.

A further object is to provide such a method and apparatus which is particularly, though not exclusively, adapted for real-time digital multiplication.

A further object is to provide a novel method and apparatus of more general utility that may be used with decimal and other multiplication systems, as well.

Another advantage of the invention, particularly in the case of a digital multiplication system involving the use of binary digit information, is the provision of a new and improved circuit in which the operands are presented to the multiplier serially, with the least significant binary digit arriving first, and with the product binary digits being produced at the same rate; the least significant binary digit of the product resulting immediately after the arrival of the least significant digits of the operand.

Still a further feature of the type of apparatus of the invention resides in the fact that the circuit is iterative; that is, it is constructed by interconnecting a number of substantially identical modules so that the desired multiplication factors may be attained merely by employing the desired number of modules. The amount of equipment that is required for the practice of the invention in this form, therefore, varies linearly with the length of operands.

Other and further objects will be explained hereinafter and will be more particularly pointed out in connection with the appended claims.

Figure 1:
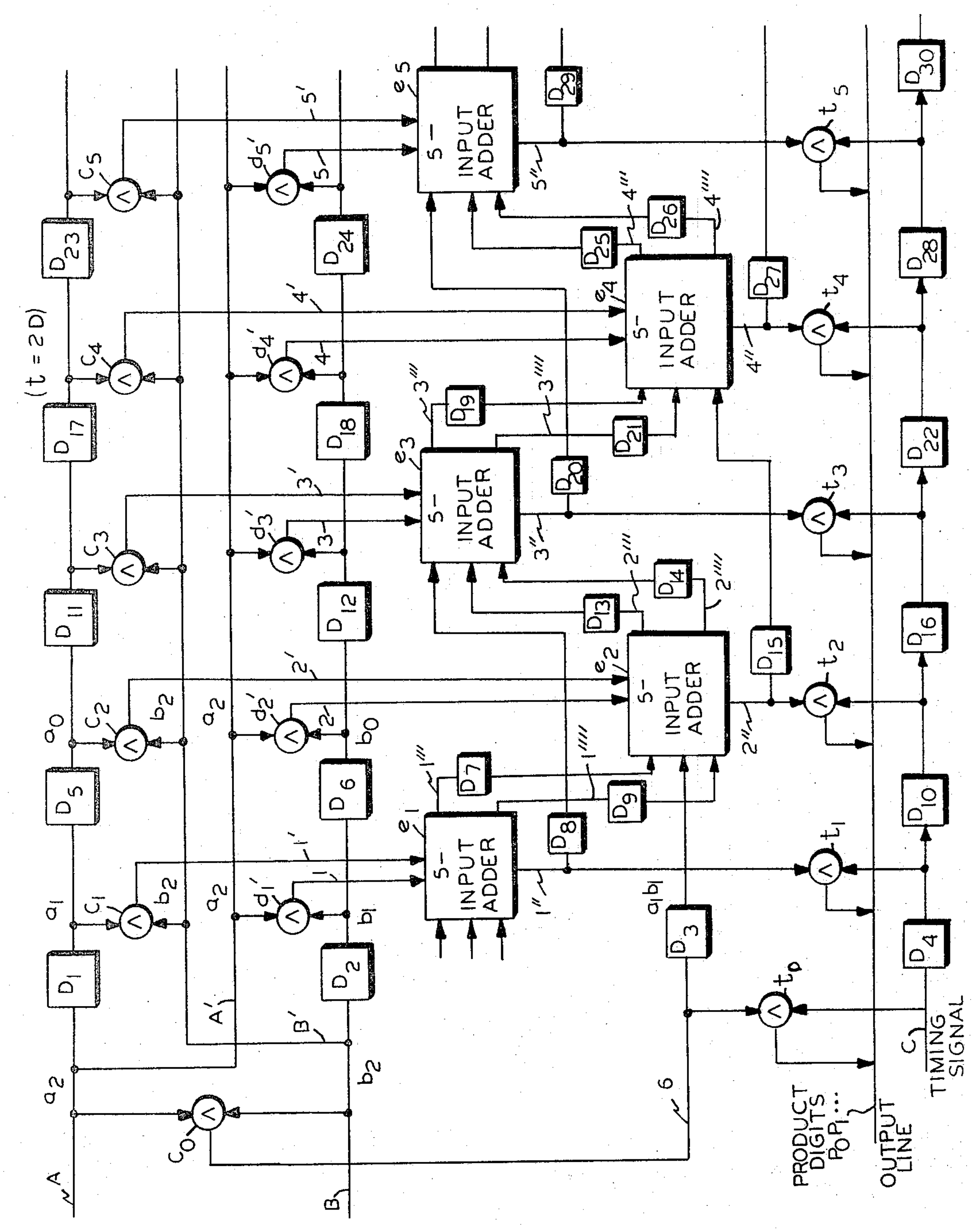
Figure 2:
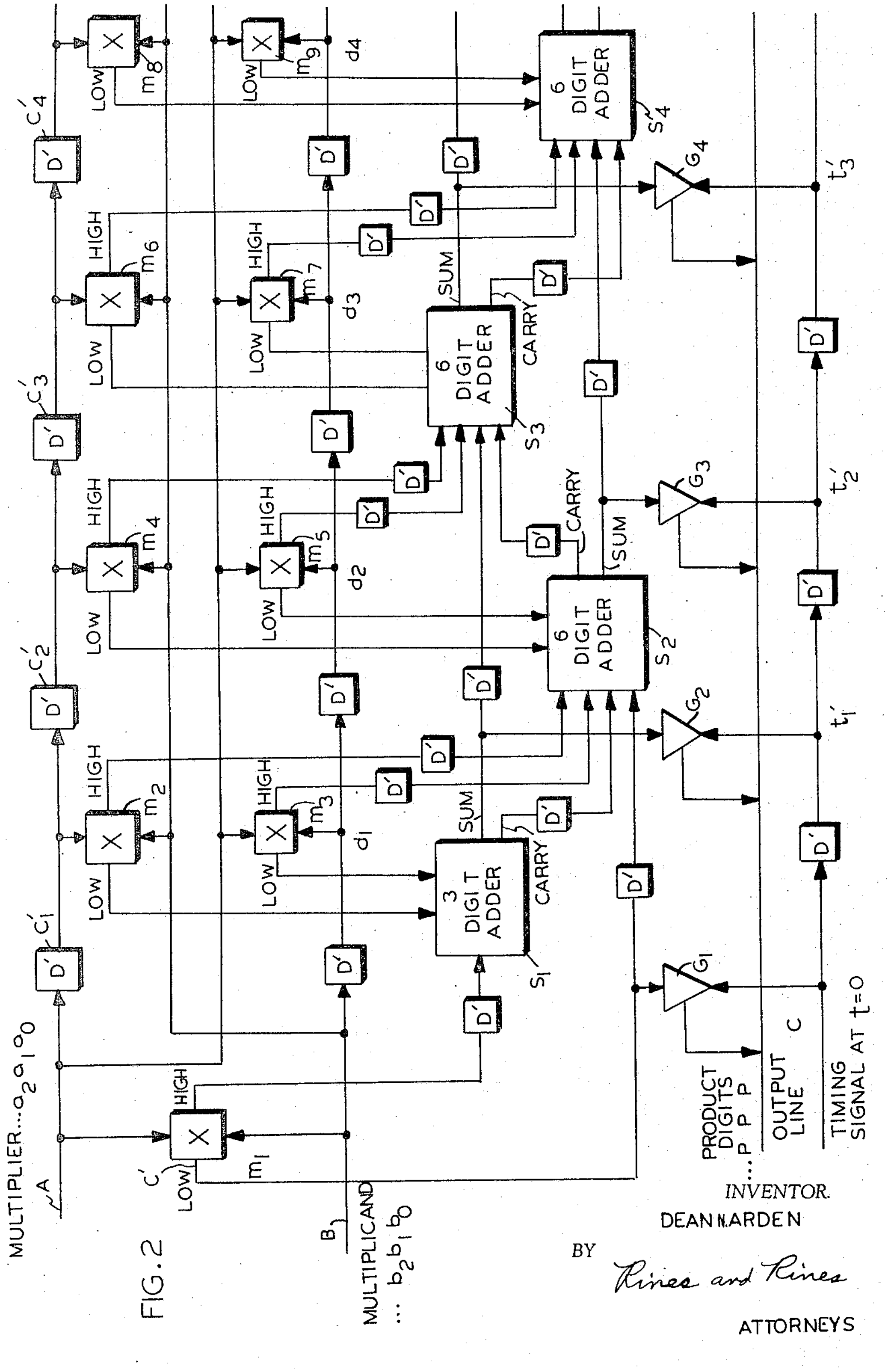

The invention will now be described with reference to the accompanying drawings, FIG. 1 of which is a block circuit diagram illustrating the invention in preferred form as applied to a binary digit multiplication system; and FIG. 2 is a similar diagram of a circuit adapted for decimal multiplication.

Assume that two binary numbers $a=a_n a_{n-1} \ldots a_1 a_0$ and $b=b_n b_{n-1} \ldots b_1 b_0$ are to be multiplied. The notations $a_n a_{n-1} \ldots a_1 a_0$ and $b_n b_{n-1} \ldots b_1 b_0$ are the conventional abbreviations for $$a_n \cdot 2^n + a_{n-1} \cdot 2^{n-1} + \ldots + a_1 \cdot 2^1 + a_0 \cdot 2^0$$

and $$b_n \cdot 2^n + b_{n-1} \cdot 2^{n-1} + \ldots b_1 \cdot 2^1 + b_0 \cdot 2^0.$$

The binary digits of $a$ and $b$ are assumed to occur at successive equally spaced intervals of time in the order of their subscripts; $a_0$ at $t=0$, $a_1$ at $t=D$, $a_2$ at $t=2D$ . . . etc. In actual practice, a binary digit of one (1) may be represented by a relatively high voltage and a binary digit of zero (0) by a relatively low voltage, including zero voltage.

If the product is denoted by $p_{2n+1} p_{2n} \ldots p_1 p_0$, then the digits of the product are produced by equating corresponding powers of ten in the equation $$(1) \quad (a_n \cdot 2^n + a_{n-1} \cdot 2^{n-1} + \ldots + a_1 \cdot 2^1 + a_0 \cdot 2^0)(b_n \cdot 2^n + b_{n-1} \cdot 2^{n-1} + \ldots + b_1 \cdot 2^1 + b_0 \cdot 2^0) = p_{2n+1} \cdot 2^{2n+1} + p_{2n} \cdot 2^{2n} + \ldots + p_1 \cdot 2^1 + p_0 \cdot 2^0$$

More specifically, $$(2) \quad p_0 = a_0 \cdot b_0$$

$$p_1 = (a_0 \cdot b_1 + a_1 \cdot b_0) \bmod 2$$

$$p_2 = (a_0 \cdot b_2 + a_1 \cdot b_1 + a_2 \cdot b_0 + (a_0 \ldots b_1 + a_1 \cdot b_0)/2) \bmod 2$$

etc., where the parenthetical term $(a_0 \ldots b_1 + a_1 \cdot b_0)/2 \bmod 2$ denotes the remainder that results when the integer part of the number (not necessarily itself an integer) contained in the parentheses is divided by 2.

For example, let $$(3) \quad a_3 a_2 a_1 a_0 = 1011 \text{ (multiplicand)}$$

and $$b_3 b_2 b_1 b_0 = 1001 \text{ (multiplier)}$$

Then, following the set of Equation 2, (4)

$$p_0 = a_0 \cdot b_0 = 1.1 = 1$$

$$p_1 = (a_0 \cdot b_1 + a_1 \cdot b_0) \bmod 2$$

$$= (1.0 + 1.1) \bmod 2 = 1 \bmod 2$$

$= 1$ (since 1 can be divided by 2 zero times with a remainder of 1)

$$p_2 = (a_0 \cdot b_2 + a_1 \cdot b_1 + a_2 \cdot b_0 + (a_0 \cdot b_1 + a_1 \cdot b_0)/2 \bmod 2$$

$$+ (1.0 + 1.0 + 1.0 + (1.0 + 1.1)/2 \bmod 2$$

$$= (0 + 1/2) \bmod 2$$

$$= (0 + 0) \bmod 2 = 0$$

Similarly, it may be shown that $$p_3 = 0,$$
$$p_4 = 0,$$
$$p_5 = 1,$$
$$p_6 = 1, \text{ and}$$
$$p_7 = 0.$$

The product $p_7 p_6 p_5 \ldots p_2 p_1 p_0$ is therefore 1100011.

In accordance with this method of multiplication, the least significant product digit $P_0$ is $a_0.b_0$ (with possibly a carry $c_0$). The next product digit is found by forming $a_0.b_1 + a_1.b_0$ (plus $c_0$, if it exists) which will give the required product digit $p_1$ and possibly a carry $c_1$. The carry $c_1$ must be added as part of the formation of the next product digit $p_2$. This digit $p_2$ is formed by adding the before-mentioned carry $c_1$, if it exists to the result $a_0.b_2 + a_1.b_1 + a_2.b_0$. This calculation produces the product digit $p_3$ and a further carry $c_2$. As later explained, the preferred circuit of the invention actually adds the carry $c_1$ to $a_1.b_1$ since both of the results are available coincidentally with the operand digits $a_1$ and $b_1$. The result is added at the next interval to $a_0.b_2 + a_2.b_0$ to give the proper calculation for the product digit $p_3$.

Applying this technique to, for example, the problem of multiplying a multiplicand $a_3$, $a_2$, $a_1$, $a_0$ and a multiplier $b_3$, $b_2$, $b_1$, $b_0$, the invention provides for monitoring signals corresponding to $a_0$ and $b_0$ and multiplying the same to produce a product signal $p_0$ and possibly a carry signal $c_0$; monitoring the signals corresponding to $a_1$ and $b_1$, multiplying the same, storing the resulting signal corresponding to $a_1.b_1$, and multiplying the said $a_1$ signal by the said $b_0$ signal and the said $a_0$ signal by the said $b_1$ signal and adding thereto the carry signal $c_0$ to produce a second product signal $p_1$ and possibly a second carry signal $c_1$; monitoring the signals corresponding to $a_2$ and $b_2$, multiplying the same, storing the resulting signal corresponding to $a_2.b_2$, multiplying the $a_2$ signal by the $b_1$ signal and the $a_1$ signal by the $b_2$ signal, storing the resulting signal corresponding to $a_2.b_1$ and $a_1.b_2$, multiplying the $a_2$ signal by the $b_0$ signal and the $a_0$ signal by the $b_2$ signal and adding the said stored $a_1.b_1$ signal thereto and the said second carry signal $c_1$ to produce a third product signal $p_2$ and possibly a third carry signal $c_2$; monitoring the signals corresponding to $a_3$ and $b_3$, multiplying the same, storing the resulting signal corresponding to $a_3.b_3$, multiplying the $a_2$ signal by the $b_3$ signal and the $a_3$ signal by the $b_2$ signal, storing the resulting signal corresponding to $a_2.b_3$ and $a_3.b_2$, multiplying the $a_3$ signal by the $b_1$ signal and the $a_1$ signal by the $b_3$ signal, storing the resulting signal corresponding to $a_3.b_1$ and $a_1.b_3$, multiplying the $a_0$ signal by the $b_3$ signal and the $a_3$ signal by the $b_0$ signal and adding thereto the said stored $a_2.b_1$ and $a_1.b_2$ signals and the said third carry signal $c_2$ to produce a fourth product signal $p_3$ and possibly a fourth carry signal $c_3$; adding the said stored signals $a_2.b_2$, $a_1.b_3$ and $a_3.b_1$ together with the said fourth carry signal $c_3$ to produce a fifth product signal $p_4$ and possibly a fifth carry signal $c_4$; adding the said stored signals $a_2.b_3$ and $a_3.b_2$ to the said fifth carry signal $c_4$ to produce a sixth product signal $p_5$ and possibly a sixth carry signal $c_5$; adding to said stored signal $a_3.b_3$ to the said sixth carry signal $c_5$ to produce a further product signal $p_6$ and possibly an additional product signal $p_7$; and responding to the said produced product signals $p_7, p_6, p_5, p_4, p_3, p_2, p_1, p_0$ to obtain the product of the first-named multiplicand and multiplier sets of signals.

Having described the method of multiplication underlying the invention, it remains to discuss a preferred circuit or apparatus for carrying out the same. Such a circuit is shown in FIG. 1 embodying a pair of signal lines or paths A and B for receiving and thus monitoring the arrival of the sets of multiplicand and multiplier signals $a_3$, $a_2$, $a_1$, $a_0$ and $b_3$, $b_2$, $b_1$, $b_0$, respectively. A chain or shift register of successive similar conventional delay circuits or devices, later described is, connected serially with each of the signal-applying or monitoring input lines A and B; the chain $D_1$, $D_5$, $D_{11}$, $D_{17}$ and $D_{23}$ for the line A, and the similar chain $D_2$, $D_6$, $D_{12}$, $D_{18}$ and $D_{24}$ for the line B. The output of each delay device employed in the circuit of FIG. 1 is the same as the input, but delayed D units of time. Another similar register of successive delay devices $D_4$, $D_{10}$, $D_{16}$, $D_{22}$, $D_{28}$ and $D_{30}$ is connected to a "timing signal" line C for receiving timing impulses.

The output of each of the delay devices of these chains is connected to a corresponding conventional signal combining "and" gate, later described, the output of which is a "1" if and only if the input thereto from the corresponding delay device and a second input, hereinafter specified, are both "1." Thus, in FIG. 1, the "and" gates of the set $C_1$, $C_2$, $C_3$, $C_4$ and $C_5$ each have an input fed thereto from the output of respective delay devices $D_1$, $D_5$, $D_{11}$, $D_{17}$ and $D_{23}$. "And" gates of the set $d_1'$, $d_2'$, $d_3'$, $d_4'$ and $d_5'$ similarly are shown fed from the outputs of respective delay devices $D_2$, $D_6$, $D_{12}$, $D_{18}$ and $D_{24}$. In the same manner, the outputs of delay devices $D_4$, $D_{10}$, $D_{16}$, $D_{22}$ and $D_{28}$ respectively feed an input to "and" gates $t_1$, $t_2$, $t_3$, $t_4$ and $t_5$.

A cross-connection between in put lines A and B and the delay-device chains is effected by conductors A' and B', respectively providing the second inputs to "and" gates $d_1'$, $d_2'$, $d_3'$,$d_4'$ and $d_5'$ and "and" gates $c_1$, $c_2$, $c_3$, $c_4$ and $c_5$.

The outputs of the sets of "and" gates $d_1'$, $d_2'$, $d_3'$, $d_4'$, $d_5'$ and $c_1$, $c_2$, $c_3$, $c_4$, $c_5$ are applied to a pair of the inputs of five conventional adder circuits $e_1$, $e_2$, $e_3$, $e_4$, $e_5$, later described, adapted to produce a sum and two carry digit signal outputs for five input signals, as follows:

| Number of Inputs that are "one" | Sum Digit Output | One of the Carry Digit Outputs | Another of the Carry Digit Outputs |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 1 | 1 |
| 5 | 1 | 1 | 1 |

All of the five inputs are equally weighted, with the sum digit output being the sum-modulo-2 of the inputs. The carry inputs of successive adders are from previous stages and the carry outputs represent combinations of 00, 10 and 11, only, as above shown.

The first five-input adder $e_1$ has applied to it, by respective conductors 1 and 1', the two outputs only of "and" gates $d_1'$ and $c_1$ and it produces a sum digit output at 1'', one carry output at 1''' and the other carry output at 1''''.

The second adder $e_2$ receives five inputs as follows: the two outputs of "and" gates $d_2'$ and $c_2$ by respective conductors 2 and 2'; the two carry outputs of the immediately preceding adder $e_1$ by way of conductors 1''' and 1'''' after delay in further respective delay units or devices $D_7$ and $D_9$; and a fifth input from the output of a further "and" gate $c_0$, operated by inputs from lines A and B, and fed through a further delay circuit $D_3$ by way of conductor 6. Two carry outputs result at conductors 2''' and 2'''', and a sum digit output at 2''.

Similarly the five inputs to adder $e_3$ are: conductors 3 and 3' from respective "and" gates $d_3'$ and $c_3$; conductors 1'', 2''' and 2'''' after passing through respective delay devices $D_8$, $D_{13}$ and $D_{14}$. Two carry outputs are produced at 3''' and 3'''' and a sum digit output at 3''.

The inputs to five-input adder $e_4$ are fed by conductors 4 and 4' from respective "and" gates $d_4'$ and $c_4$ and by conductors 2'', 3''' and 3'''' through respective delay devices $D_{15}$, $D_{19}$ and $D_{21}$. Carry outputs at 4''' and 4'''' and a sum digit output at 4'' result.

The last adder $e_5$ receives two of its inputs via conductors 5 and 5' from "and" gates $d_5'$ and $c_5$, and the other three inputs from conductors 4''' and 4'''' of the immediately preceding adder $e_4$ and 3' from the adder $e_3$ previous to the adder $e_4$, via respective delay devices $D_{25}$, $D_{26}$ and $D_{20}$, respectively. The sum digit output of adder $e_5$ is shown at 5''.

The respective sum digit outputs of the adders $e_1$, $e_2$, $e_3$, $e_4$ and $e_5$ at 1'', 2'', 3'', 4'' and 5'' are fed as the second input to the before-mentioned "and" gates $t_1$, $t_2$, $t_3$, $t_4$ and $t_5$, respectively. The outputs of the gates $f_1$–$f_5$, in turn feed the "product digits" output line ($p_0p_1$ . . .), together with the output from a further "and" gate $t_0$ responding to inputs from conductor 6 and the "timing signal" line C.

That this circuit performs the operations at successive time intervals D required to practice the multiplication method previously described will now be demonstrated. At time $t=0$, the binary digit signals $a_0$ and $b_0$ are applied at lines A and B, and a timing signal is applied at C. The "and" gate $c_0$ produces the correct low order product digit $p_0$ which is applied along conductor 6 and gated from "and" gate $t_0$ to the "product digits" output line by the timing signal applied at $t=0$ to C.

At time $t=D$, the binary digit signals $a_1$ and $b_1$ are received or monitored at lines A and B, respectively, and the digit signals $a_0$ and $b_0$ (having been respectively stored through delay devices $D_1$ and $D_2$) appear at the inputs to respective "and" gates $c_1$ and $d_1'$. The other inputs of "and" gates $c_1$ and $d_1'$ respectively receive, at this time, signals corresponding to $b_1$ and $a_1$. The products $a_0.b_1$ and $a_1.b_1$ are thus applied along conductors 1' and 1 to the adder $e_1$, producing at 1'' a sum digit signal which is the next product digit $p_1$ and a carry (at 1''' or 1'''') that is to be added into the next product digit position. The timing signal at C feeding "and" gate $t_1$ into which conductor 1″ also feeds, thus allows product digit signal $p_1$ to appear at the "products digits" output line. At the same time, however, signals $a_1$ and $b_1$ have been applied to gate $c_0$, to produce the signal $a_1.b_1$ to be added in to the next product digit position. The timing signal now advances through $D_{10}$ to "and" gate $t_2$.

At time $t=2D$ (the illustrative condition for which signal legends are applied to FIG. 1), the five-input adder $e_2$, receives inputs along 2′ and 2 from the "and" gates $c_2$ and $d_2'$ corresponding to $a_0.b_2$, and $a_2.b_0$, input $a_1.b_1$ from conductor 6 and delay device $D_3$ and a carry from one of its two inputs 1‴ or 1⁗. The addition of these signals yields at 2″ the product digit signal $p_2$ which is gated at $t_2$, by the timing signal advanced through delay device $D_{10}$, to the output line. There can be at most two carries which are to be added into the next product position. At the same time, the product $a_2.b_2$ is formed at $c_0$ and the sum $a_1.b_2+a_2.b_1$ is applied along 1 and 1′ to adder $e_1$.

At time $t=3D$, adder $e_3$ receives inputs $a_0.b_3$ and $a_3.b_0$ along conductors 3′ and 3 from the respective "and" gates at $c_3$ and $d_3'$, and signals $a_1.b_2+a_2.b_1$ along 1″ and $D_8$ from the adder $e_1$ plus carries from the previous product digit position, along $D_{13}$ or $D_{14}$. Again, the sum digit signal at 3″ is the appropriate product digit $p_3$ which is gated at $t_3$ to the output line by the timing signal which is now applied to the gate $t_3$, having been delayed by $D_{16}$. The adder $e_2$ produces at most two carries, since the maximum sum is 5 (which is 2×2+1 or 1 for the sum digit and a carry of two into the next higher order product position), assuming the form of a "1" signal on both carry lines 2‴ and 2⁗. These carries arrive at adder $e_3$ at time $t=4D$ when adder $e_3$ is computing $a_1.b_4+a_4.b_1$, which is a contributing sum to $p_5$. These carries, therefore, are added into the next product position.

At time $t=4D$, the part of $a_1.b_3+a_3.b_1+a_2.b_2+$ carries which remains after the carries are sent to $e_3$ is available along conductor 2″ at the output of the delay device $D_{15}$ and is thus added into the adder $e_4$ to the signals corresponding to $a_0.b_4$ and $b_0.a_4$, fed along 4′ and 4 from the gates $c_4$ and $d_4'$, and carries from lower order product positions.

The adder $e_4$ may produce two carries which are added by adder $e_5$ at time $t=5D$ to signals $a_1.b_5$ and $a_5.b_1$, fed from gates $c_4$ and $D_4'$, contributing to product digit $p_6$. The carries are again thus effectively added into the next product digit.

The output of adder $e_4$ after the carries are sent to adder $e_5$ along conductors 4‴ and 4⁗, is that part of $$a_0 \cdot b_4 + a_1 \cdot b_3 + a_2 \cdot b_2 + a_3 \cdot b_1 + a_0 \cdot b_4 +$$

carries into the 4th product digit, which forms the product digit $p_4$. This result is fed at 4″ through gate $t_4$ to the output line, since the initial timing signal at C is now at the output of the delay device $D_{22}$ when $t=4D$.

The remaining product digits are similarly produced. If $2n$ product digits are desired, indeed, there must be $2n$ adders of the type $e_1$, $e_2$, etc., with iterative delay, gate and adder sections readily added, as required. While, moreover, the invention has thus far been illustratively described in connection with serial computation (that is, where the successive digit signals arrive after one other at successive intervals of time), the method underlying the invention is obviously generally applicable to parallel computers, as well, wherein all the digits are present but each is successively examined. It should be observed, moreover, that it is not possible to multiply any faster than in accordance with the invention since the product is produced just as fast as the operands enter the system. The combined advantages of iterative circuits and real-time multiplication are attained.

While the invention, furthermore, has been described in connection with the illustration of binary digit multiplication, decimal and other multiplication may also be effected, as previously stated. A decimal system embodying the method underlying the invention, indeed, is presented in FIG. 2. Since the general arrangement of the system of FIG. 2 is similar to that of FIG. 1, in order to simplify the drawing and description, all the identical delay devices have been given the same reference symbol D′, including the three chains or registers associated with input lines A and B and timing signal line C. Instead of "and" gates, the system of FIG. 2 employs similar two-digit decimal multipliers, later described, represented by the common symbol × and labelled $m_1$ through $m_9$. Each multiplier $m_1$–$m_9$ receives a pair of decimal digit signals (such as $a_0$ and $b_0$ from lines A and B in the case of multiplier $m_1$), and produces the high and low order digits of their product at outputs respectively labelled "low" and "high." If, for example, the incoming digits are 3 and 8, the "high" order output is 2 and the "low" order output is 4 (representing the product 24). In actual practice, each line may be four or more lines depending on the code used for representing a decimal digit.

In place of the five input adders, conventional 6-digit adders $S_1$–$S_4$ are employed in the system of FIG. 2, each accepting six decimal digits and producing a low order output digit signal (at the "sum" output) and a high order output digit signal (at the "carry" output). For example, if the input digits are 5, 4, 3, 3, 6, 8, the sum output will be 9 and the carry output will be 2 (representing a sum of 29).

The gates $t_1$–$t_5$ in the binary system of FIG. 1 are replaced by conventional gates $G_1$–$G_4$ in FIG. 2, later discussed, that allow a digit signal appearing at the upper inputs thereof to pass to the product "output line" only if a timing signal is applied to the gates, and otherwise permits no output from the gates.

It is believed most conducive to simple explanation of the apparatus of FIG. 2 to consider a particular example of decimal multiplication, in accordance with the method of the invention, and to trace the same through the apparatus.

Let it be assumed, therefore, that the following digits are to be multiplied:

$$a_3a_2a_1a_0=4312$$
$$b_3b_2b_1b_0=3587$$

At time $t=0$ the signals corresponding to digits (2) and (7), above, are received or monitored at lines A and B. A timing signal applied at C to gate $G_1$ allows the low order output (4) of the multiplier $m_1$ to appear as the first product digit $p_0$ at the "output-line." The high order product digit (1) is sent to adder $S_1$ through a delay device D′.

At time $t=D$, the digits (2) and (7) are at points $c_1'$ and $d_1'$, passing through first delay devices D′, and the digit signals (1) and (8) are at lines A and B. The multipliers $m_2$ and $m_3$ produce 2×8=16 and 1×7=7, respectively. The low order digits (6 and 7) are added to the before-mentioned high order product digit (1) in $S_1$ to produce 1+6+7=14. The sum digit (4) is sent to the "output line" as product digit $p_1$ since the timing signal is at point $t_1'$ when time $t=D$. The carry digit (1) is sent to adder $S_2$ through a delay device D′ as are the high order parts of 2×8=16 and 1×7=7 (i.e. (1) and (0), respectively).

Simultaneously, at time $t=D$ the product 1×8=8 is computed by multiplier $m_1$ and the low order digit (8) is sent to $S_2$ through a delay device D′, while the high order digit, (0) is sent to $S_1$, also through a delay device D′.

At time $t=2D$, digit signals (2) and (7) are at points $c_2'$ and $d_2$; digit signals (1) and (8) are at points $c_1'$ and $d_2$; and digit signals (3) and (5) are at lines A and B, respectively. The multipliers $m_4$ and $m_5$ compute 2×5=10 and 7×3=21. The low order digits (0) and (1), are sent to $S_2$ where they are added to the low order part of 1×8, the carry from $S_1$, and the high order digits from multipliers $m_2$ and $m_3$ at time $t=D$. This produces a sum 0+1+8+1+1+0 which is 11. The low order digit (1) is sent to the "output line" as $p_2$, and a carry of (1) is sent to $S_3$ through a delay device D′. Simultaneously, the low order digits of 3×8 and 4×5 are added in $S_1$ to the high order digit of 1×8=8 (which is zero), giving a sum digit (9). This is sent to $S_3$ through a delay device D′. A carry (2) is sent to $S_2$ through a delay device D′, as are the high order digit signals (2) and (0), emanating, respectively, from 3×8=24 and 1×5=5 from multipliers $m_4$ and $m_5$.

So far, the product digits . . . 144 have been computed, the complete correct result being 15467144 for this example.

At time $t=3D$, digit signals (2) and (7) are at points $c_3'$ and $d_3$; digit signals (1) and (8) are at points $c_2'$ and $d_2$; digit signals (3) and (5) are at points $c_1'$ and $d_1$; and digit signals (4) and (3) are at lines A and B. At adder $S_3$, the low order digits of 4×7=28 and 2×3=06 are added to the high order digits from multipliers $m_4$ and $m_5$ at time $t=2D$ (i.e. (2) and (0)), a carry (2) from $S_2$ at time $t=2D$, and a sum digit from adder $S_1$ at time $t=2D$, which is (9). This gives 8+6+2+0+2+9=27. The low order digit or sum (7) is sent to the "output line" as $p_3$ and the high order digit, or carry (2) is sent to adder $S_4$ through a delay device D′.

This gives an output product of . . . 7144 so far. To continue the product, four zeroes must be entered at lines A and B and four more stages must be added to the circuit. These stages can be considerably simplified since the multipliers always have "0" as one input digit and can hence be omitted, together with the delays and other circuit connections associated with them. The first adder in the extension must receive 4 digits, while the reset may be two-digit adders. In the given example, the delays at points $c_4'$ and $d_4$ and the multipliers $m_8$ and $m_9$ are not required, leaving only four inputs to adder $S_4$ and two inputs to the three other adders in the series, which are not shown.

Examples of conventional components utilizable in the systems of FIGS. 1 and 2 follow: the delay devices of both may be of the type described in Arithmetic Operations in Digital Computers, p. 47; the "and" gates of FIG. 1 may be of the type described in Arithmetic Operations in Digital Computers, p 32; multiple-input adders for the system of FIG. 1 may be of the type described in Arithmetic Operations in Digital Computers, p. 81; the two-digit multipliers of FIG. 2 may be of the type described in Arithmetric Operations in Digital Computers, p. 260; the multiple-input adders for the system of FIG. 2 may be of the type described in Arithmetic Operations in Digital Computers, p. 209; and the gates feeding product digits to the output line of FIG. 2 may be of the type described in Arithmetic Operations in Digital Computers, p. 260. Clearly, other equivalent or well-known delay, gating, adder and multiplier circuits and devices may also readily be employed, as well. Further modifications will also occur to those skilled in the art and all such are considered to fall within the spirit and scope of the invention as defined in the appended claims.

What is claimed is:

1. Computation apparatus having, in combination, a pair of signal-receiving paths; a corresponding pair of chains of serially connected delay devices, one chain connected with each path; a pair of sets of signal-combining means, one corresponding to each signal-receiving path and connected to each of the delay devices of the pair of chains and also connected with the non-corresponding signal-receiving path; a plurality of multiple-input adders, one connected with each of the signal-combining means and some of which are connected to receive the sum and carry signals of previous adders; and gating means for feeding successive adders to a common output at successive instants of time corresponding to the successive signal delays produced along the said chains.

2. Apparatus as claimed in claim 1 and in which the said some of the adders are connected to receive a delayed carry signal from the immediately preceding adder and delayed sum signal from the adder previous to the said preceding adder.

3. Apparatus as claimed in claim 1 and in which at least some of the said adders are provided with at least five signal inputs and sum-signal and carry-signal outputs.

4. Apparatus as claimed in claim 1 and in which the said gating means comprises a plurality of gate devices connected with each adder.

5. Apparatus as claimed in claim 4 and in which there is provided a third chain of delay devices connected with means for applying a timing signal thereto, and each delay device thereof is connected to one of the said gate devices.

6. Apparatus as claimed in claim 1 and in which the said signals are binary digit signals.

7. Apparatus as claimed in claim 6 and in which the said signal-combining means comprise "and" gate circuits.

8. Apparatus as claimed in claim 6 and in which the output of the adders is the sum-modulo-2 of the input signals applied thereto.

9. Apparatus as claimed in claim 8 and in which the said carry signals represent one of 00, 10, 11.

10. Apparatus as claimed in claim 1 and in which the said signals are decimal digit signals.

11. Apparatus as claimed in claim 10 and in which the said signal-combining means comprises multiplier devices.

12. Apparatus as claimed in claim 11 and in which each multiplier device is a two-digit-signal decimal multiplier that produces high and low order signal digit outputs of the product of the two digit signals.

13. Apparatus as claimed in claim 10 and in which at least some of the said adders are provided with six signal inputs and a sum-signal output and a carry-signal output.

14. Apparatus as claimed in claim 13 and in which the sum-signal output is a low order digit signal and the carry-signal output is a high order digit signal of the sum of the input signals.

15. Apparatus as claimed in claim 1 and in which signal-combining means is connected between the said paths to produce an initial product-digit signal.

16. Apparatus as claimed in claim 15 and in which timing-signal means is provided for enabling the feeding out of the said initial product-digit signal substantially simultaneously with the initial application of the signals to the said paths.

17. Apparatus as claimed in claim 1 and in which means is provided for first applying to the said paths signals corresponding to the least significant digits of a pair of sets of signals corresponding to a multiplicand and a multiplier.

18. Apparatus as claimed in claim 1 and in which there are at least five delay devices in each chain and five adders.

19. Apparatus for multiplying a pair of sets of signals representing, respectively, a multiplicand $a_3$, $a_2$, $a_1$, $a_0$ and a multiplier $b_3$, $b_2$, $b_1$, $b_0$, that comprises, means for monitoring the signals corresponding to $a_0$ and $b_0$ and means for multiplying the same to produce a product signal $p_0$ and possibly a carry signal $c_0$; means for monitoring the signals corresponding to $a_1$ and $b_1$, means for multiplying the same, means for storing the resulting signal corresponding to $a_1.b_1$, and means for multiplying the said $a_1$ signal by the said $b_0$ signal and the said $a_0$ signal by the said $b_1$ signal and means for adding thereto the carry signal $c_0$ to produce a second product signal $p_1$ and possibly a second carry signal $c_1$; means for monitoring the signals corresponding to $a_2$ and $b_2$, means for multiplying the same, means for storing the resulting signal corresponding to $a_2.b_2$, means for multiplying the $a_2$ signal by the $b_1$ signal and the $a_1$ signal by the $b_2$ signal, means for storing the resulting signal corresponding to $a_2.b_1$ and $a_1.b_2$, means for multiplying the $a_2$ signal by the $b_0$ signal and the $a_0$ signal by the $b_2$ signal and means for adding the said stored $a_1.b_1$ signal thereto and the said second carry signal $c_1$ to produce a third product signal $p_2$ and possibly a third carry signal $c_2$; means for monitoring the signals corresponding to $a_3$ and $b_3$, means for multiplying the same, means for storing the resulting signal corresponding to $a_3.b_3$, means for multiplying the $a_2$ signal by the $b_3$ signal and the $a_3$ signal by the $b_2$ signal, means for storing the resulting signal corresponding to $a_2.b_3$ and $a_3.b_2$, means for multiplying the $a_3$ signal by the $b_1$ signal and the $a_1$ signal by the $b_3$ signal, means for storing the resulting signal corresponding to $a_3.b_1$ and $a_1.b_3$, means for multiplying the $a_0$ signal by the $b_3$ signal and the $a_3$ signal by the $b_0$ signal and means for adding thereto the said stored $a_2.b_1$ and $a_1.b_2$ signals and the said third carry signal $c_2$ to produce a fourth product signal $p_3$ and possibly a fourth carry signal $c_3$; means for adding the said stored signals $a_2.b_2$, $a_1.b_3$ and $a_3.b_1$ together with the said fourth carry signal $c_3$ to produce a fifth product signal $p_4$ and possibly a fifth carry signal $c_4$; means for adding the said stored signals $a_2.b_3$ and $a_3.b_2$ to the said fifth carry signal $c_4$ to produce a sixth product signal $p_5$ and possibly a sixth carry signal $c_5$; means for adding the said stored signal $a_3.b_3$ to the said sixth carry signal $c_5$ to produce a further product signal $p_6$ and possibly an additional product signal $p_7$; and means for responding to the said produced product signals $p_7$, $p_6$, $p_5$, $p_4$, $p_3$, $p_2$, $p_1$, $p_0$ to obtain the product of the first-named multiplicand and multiplier sets of signals.

20. Apparatus as set forth in claim 19 and in which at least one of the multiplicand and multiplier sets of signals consists of three signal digits only.

21. Apparatus as set forth in claim 19 and in which at least one of the multiplicand and multiplier sets of signals consists of two signal digits only.

22. Apparatus as set forth in claim 19 and in which the signals are binary digit signals.

23. Apparatus as set forth in claim 19 and in which the signals are decimal digit signals.

24. Apparatus for real-time multiplication of a pair of sets of signals representing, respectively, a multiplicand and a multiplier, that comprises, means for applying the signals of each pair of sets of signals serially at a given rate along a separate path with the signals corresponding to the least significant digits applied first, means for delaying the signals at successive time intervals along each path, means for multiplying the delayed signals of the paths at the successive time intervals, means for adding pluralities of the multiplied signals, and means operable at the successive time intervals feeding out product signals at the said rate, with the product signal corresponding to the least significant digit of the product fed out substantially immediately after the said applying of the signals corresponding to the least significant digits of the multiplicand and multiplier.

25. Apparatus as claimed in claim 24 and in which the said applied signals correspond to binary digits.

26. Apparatus as claimed in claim 24 and in which the said applied signals correspond to decimal digits.

27. Apparatus as claimed in claim 24 and in which there is further provided means for successively delaying a timing signal along a further path substantially simultaneously with the successive delaying of the said pair of sets of signals along their respective paths, and means for controlling the product-signal feeding out in accordance with the successively delayed timing signal.

28. Apparatus as claimed in claim 24 and in which there is provided means for adding to a plurality of the added multiplied signals carry signals from previous multiplied added signals.

29. Apparatus as claimed in claim 28 and in which the last-named adding means produces the sum-modulo-2 of the signals that are added.

30. Apparatus as claimed in claim 29 and in which the said carry signals represent one of zero, one and two.

References Cited by the Examiner

UNITED STATES PATENTS 3,016,195 1/1962 Hamburgen ---------- 235—164

MALCOLM A. MORRISON, *Primary Examiner.*

ROBERT C. BAILEY, *Examiner.*

T. M. ZIMMER, I. FAIBISH, M. P. HARTMAN, *Assistant Examiners.*